United States Patent [19]

Heidingsfeld et al.

[11] Patent Number: 5,795,948
[45] Date of Patent: Aug. 18, 1998

[54] MULTISTAGE PROCESS FOR PRODUCTION OF THERMOPLASTIC POLYURETHANE ELASTOMERS

[75] Inventors: Herbert Heidingsfeld, Frechen; Wolfgang Bräuer, Leverkusen; Friedemann Müller, Neuss; Willi Meister, Dormagen, all of Germany

[73] Assignee: Bayer Aktiengesellschaft, Leverkusen, Germany

[21] Appl. No.: 654,508

[22] Filed: May 28, 1996

Related U.S. Application Data

[63] Continuation-in-part of Ser. No. 336,344, Nov. 8, 1994, abandoned, which is a continuation of Ser. No. 63,375, May 18, 1993, abandoned.

[30] Foreign Application Priority Data

May 26, 1992 [DE] Germany .................. 42 17 364.7

[51] Int. Cl.⁶ .............. C08G 18/12; C08L 75/04
[52] U.S. Cl. ................ 528/59; 528/66; 528/61
[58] Field of Search .................. 528/59, 61, 66

[56] References Cited

U.S. PATENT DOCUMENTS

| | | | |
|---|---|---|---|
| 3,642,964 | 2/1972 | Rausch, Jr. et al. | 264/40 |
| 4,245,081 | 1/1981 | Quiring et al. | 528/65 |
| 4,250,292 | 2/1981 | Niederdellmann et al. | 528/44 |
| 4,521,582 | 6/1985 | Goyert et al. | 528/67 |
| 5,021,534 | 6/1991 | Kawasaki et al. | 528/60 |

FOREIGN PATENT DOCUMENTS

| | | |
|---|---|---|
| 1964834 | 7/1971 | Germany . |
| 2610980 | 9/1977 | Germany . |
| 1057018 | 2/1967 | United Kingdom . |

OTHER PUBLICATIONS

Chemical Abstract, vol. 118, No. 16, Apr. 19, 1993, Abstract #149182y, J.T. Haponiuk, et al, Selected problems related to thermoplastic urethane elastomers; & Prace Naukowe Politechniki Szczecinski, No. 443, Mar. 28, 1991, Szczecin, PI pp. 113–126.

Kunststoffe 68 (1978) Month unavailable, pp. 819–825 (English Translation Attached).

Kautschuk, Gummi, Kunststoffe 35 (1982) Month unavailable, pp. 568–584.

Braeuer et al., WPIPS Abstract No. 93–378773, Abstracting DE 4217364, Dec. 1993.

*Primary Examiner*—Jeffrey C. Mullis
*Attorney, Agent, or Firm*—Joseph C. Gil; Aron Preis

[57] ABSTRACT

Thermoplastically processable polyurethane elastomers are produced by a process of A) mixing one or more substantially linear macrodiols with a diisocyanate, B) reacting the resultant mixture in a reactor at temperatures of >100° C. to form a prepolymer, C) mixing the prepolymer with one or more low molecular weight chain extenders, and D) reacting the mixture prepared in stage C) to complete conversion in a high-shear, high-viscosity reactor.

7 Claims, No Drawings

MULTISTAGE PROCESS FOR PRODUCTION OF THERMOPLASTIC POLYURETHANE ELASTOMERS

This application is a Continuation-In-Part application of U.S. Ser. No. 08/336,344 filed Nov. 8, 1994 which is a Continuation application of U.S. Ser. No. 08/063,375 filed May 18, 1993, both abandoned.

BACKGROUND OF THE INVENTION

The present invention relates to a process for the continuous production of thermoplastic polyurethane elastomers by a multistage prepolymer/high-viscosity reactor process.

Thermoplastic polyurethane elastomers (TPU's) are well known. They are important industrially due to a combination of high-grade mechanical properties and the known cost advantages which result from thermoplastic workability. A broad and varied range of mechanical properties may be achieved by using different chemical structural components. An overview of TPU's, their properties and uses is described, e.g., in Kunststoffe 68 (1978), pages 819 to 825, or in Kautschuk, Gummi, Kunststoffe 35 (1982), pages 568 to 584.

TPU's are prepared from linear macrodiols, generally polyesters or polyethers, organic diisocyanates and short chain diols (chain extenders). They may be prepared by either a continuous or discontinuous process. The process known as the belt process and the extruder process are the best-known processes for their preparation and used industrially.

According to British Patent 1,057,018, a prepolymer is prepared from a substantially linear polyhydroxyl compound and excess organic diisocyanate at temperatures of <100° C., cooled and delivered by a metering pump to a mixing head where it is mixed with a certain quantity of a low molecular weight diol. The reaction mixture obtained is placed on a conveyor belt while heating to a temperature of up to 130° C. The reaction product is then size-reduced and heated. The long reaction time reaction product is then size-reduced and heated. The long reaction time of 1 to 2 hours required for prepolymer formation is an economic disadvantage of this process.

In the extruder process, which is described for example in German Offenlegungsschriften 1,964,834 and 2,059,570, the reaction components (i.e., the polyhydroxyl compounds, the diisocyanate and the low molecular weight glycols) are introduced into the extruder. They are individually premixed or directly introduced into the extruder as a preadduct of polyhydroxyl compound and diisocyanate and the reaction is carried out in the extruder under certain process conditions. The thermoplastic polyurethane thus produced is extruded in the form of a strand, cooled and size-reduced. The disadvantage of TPU's produced by this process is that their properties are not of a uniformly high standard for all applications. TPU's of the same composition produced by the extruder process are transparent while TPU's produced by the belt process have an opaque appearance. Opaque TPU's may readily be processed to films while transparent TPU's are less suitable for this purpose due to their tendency towards blocking.

Accordingly, there is still a need to find an economic process by which it would be possible to produce both hard injection moldings and flexible films selectively and under controlled conditions.

DESCRIPTION OF THE INVENTION

A process for the continuous production of thermoplastically processable polyurethane elastomers has now surprisingly been found in which a polyurethane is produced by a multistage process comprising A) mixing one or more substantially linear macrodiols having number average molecular weights of 500 to 5000 with a diisocyanate corresponding to the general formula OCN—Z—NCO, in which Z is a difunctional organic radical, B) reacting the mixture prepared in stage A) substantially completely in a reactor at temperatures of >100° C. to form a prepolymer, C) mixing the prepolymer prepared in stage B) with one or more low molecular weight diol chain extenders and, optionally, triol chain extenders, said chain extenders having formula molecular weights of 62 to 500, the amounts of reaction components being such that the total NCO:OH ratio for the combined amount of components used in stages A), B) and C) is from 0.9:1 to 1.2:1, and D) reacting the mixture prepared in stage C) to complete conversion in a high-shear, high-viscosity reactor where auxiliaries and/or other components are optionally incorporated therein.

Preferred macrodiols are polyester diols, polyether diols, polycarbonate diols and mixtures thereof.

Suitable polyether diols may be prepared by reacting one or more alkylene oxides having from 2 to 4 carbon atoms in the alkylene radical, with an initiator molecule which contains two active hydrogen atoms. Examples of alkylene oxides include ethylene oxide, 1,2-propylene oxide, epichlorhydrin and 1,2- and 2,3-butylene oxide. Ethylene oxide, propylene oxide and mixtures of 1,2-propylene oxide and ethylene oxide are preferred used. The alkylene oxides may be used individually, in sequence with one another, or as mixtures. Examples of initiator molecules include water; aminoalcohols such as N-alkyldiethanolamine, e.g. N-methyl-diethanolamine; and diols, such as ethyleneglycol, 1,3-propyleneglycol, butane-1,4-diol and hexane-1,6-diol. Mixtures of initiator molecules may also be used. Suitable polyetherols also include the hydroxyl group-containing polymerization products of tetrahydrofuran. The substantially linear polyether diols preferably have molecular weights of from 500 to 5000. They may be used both individually or in the form of mixtures with one another.

Suitable polyester diols may be produced for example from dicarboxylic acids having from 2 to 12 carbon atoms, and preferably from 4 to 6 carbon atoms, and polyhydric alcohols. Examples of dicarboxylic acids which may be used include aliphatic dicarboxylic acids, such as succinic acid, glutaric acid, adipic acid, ceric acid, azelaic acid and sebacic acid, and aromatic dicarboxylic acids, such as phthalic acid, isophthalic acid and terephthalic acid. The dicarboxylic acids may be used individually or as mixtures, e.g. in the form of a succinic, glutaric and adipic acid mixture. In some cases, it may be advantageous to use, in place of the dicarboxylic acids, the corresponding dicarboxylic acid derivatives, such as carboxylic acid diesters having from 1 to 4 carbon atoms in the alcohol radical, carboxylic acid anhydrides or carboxylic acid chlorides. Examples of polyhydric alcohols include glycols having from 2 to 10, and preferably from 2 to 6, carbon atoms, such as ethyleneglycol, diethyleneglycol, butane-1,4-diol, pentane-1,5-diol, hexane-1,6-diol, decane-1,10-diol, 2,2-dimethylpropane-1,3-diol, propane-1,3-diol and dipropyleneglycol. The polyhydric alcohols may, depending on the required properties, be used either alone or in mixture with one another.

Esters of carbonic acid with the above noted diols (especially those having from 4 to 6 carbon atoms, such as butane-1,4-diol and/or hexane-1,6-diol), condensation products of ω-hydroxycarboxylic acids (e.g. ω-hydroxycaproic acid) and preferably polymerization products of lactones (e.g., optionally substituted ω-caprolactones) are also suitable.

The preferred polyester diols are ethanediol polyadipates; butane-1,4-diol polyadipates; ethanediol butane-1,4-diol polyadipates; hexane-1,6-diol neopentylglycol polyadipates; hexane-1,6-diol butane-1,4-diol polyadipates; and polycaprolactones.

The polyester diols have molecular weights of from 500 to 5000.

Suitable organic diisocyanates include aliphatic, cycloaliphatic, araliphatic, heterocyclic and aromatic diisocyanates. Such isocyanates are described in, for example, Justus Liebigs Annalen der Chemie, 562, pages 75 to 136. Preferred are the aromatic diisocyanates.

Specific examples of useful isocyanates include hexamethylene diisocyanate; isophorone diisocyanate; cyclohexane-1, 4-diisocyanate; 1-methyl-2,4- and -2,6-cyclohexane-diisocyanate, and the isomer mixtures thereof; 4,4'-, 2,4'- and 2,2'-dicyclohexyl methane diisocyanate and the isomer mixtures thereof; tolylene-2,4-diisocyanate, and mixtures of tolylene-2,4-diisocyanate and tolylene-2,6-diisocyanate; 4,4'-, 2,4'- and 2,2'-diphenyl methane diisocyanate; mixtures of 2,4'- and 4,4'-diphenyl methane diisocyanate; urethane-modified liquid 4,4'-and/or 2,4'-diphenyl methane diisocyanates; 4,4'-diisocyanatodiphenylethane-(1, 2); and 1,5-naphthylene diisocyanate. Preferred isocyanates are hexamethylene-1,6-diisocyanate; isophorone diisocyanate; dicyclohexyl methane diisocyanate; diphenylmethane-diisocyanate isomer mixtures having a 4,4'-isomer content of more than 96 wt-%; 4,4'-diphenyl-methanediisocyanate; and 1,5-naphthylenediisocyanate.

The diisocyanates may be used together with up to 15% by weight (based on the amount of diisocyanate) of a polyisocyanate, provided that the amount used does not cause formation of a crosslinked product which is no longer thermoplastic. Examples of such polyisocyanates include triphenyl methane—4,4',4"-triisocyanate and polyphenyl polymethylene polyisocyanates.

Preferred chain extenders having molecular weights of from 62 to 500 are aliphatic diols having from 2 to 14 carbon atoms, such as e.g. ethanediol, hexane-1,6-diol, diethyleneglycol, dipropyleneglycol and especially butane-1,4-diol.

Also suitable as chain extenders are diesters of terephthalic acid with glycols having from 2 to 4 carbon atoms, such as e.g. terephthalic acid-bis-ethyleneglycol or -butane-1,4-diol; hydroxyalkylene ethers of hydroquinone, such as e.g. 1,4-di-(β-hydroxyethyl)hydroquinone; (cyclo)aliphatic diamines, such as e.g. isophorone diamine, ethylene diamine, 1,2- and 1,3-propylenediamine, N-methylpropylenediamine-1,3, N,N'-dimethylethylenediamine; and aromatic diamines, such as e.g. 2, 4-and 2,6-tolylene diamine, 3,5-diethyl-2,4- and/or -2, 6-tolylene diamine, and primary ortho-dialkyl-, trialkyl- and/or tetraalkyl-substituted 4, 4'-diaminodiphenylmethanes.

The diol chain extenders may be used together with up to 15% by weight (based on the amount of the diol chain extender) of a triol of molecular weight of up to 500, provided that the amount used does not cause formation of a crosslinked product which is no longer thermoplastic. Examples of such triols include glycerin, trimethylolpropane, and relatively low molecular weight alkylene oxide adducts thereof.

The reaction components, optionally in the presence of catalysts, auxiliary substances and/or additives, are reacted in such quantities that the equivalent ratio of isocyanate groups of the diisocyanate to the sum of the isocyanate-reactive groups in stages A), B) and C) (preferably only OH groups are present) is from 1:0.9 to 1:1.2, and more preferably from 1:0.95 to 1:1.1.

Suitable catalysts, which especially accelerate the reaction between the isocyanate groups and hydroxyl groups, include tertiary amines which are known according to prior art and which are conventional, such as e.g. triethylamine, dimethylcyclohexylamine, N-methylmorpholine, N,N'-dimethyl-piperazine, 2-(dimethylaminoethoxy)-ethanol, diazabicyclo-(2,2,2)-octane and the like, as well as organic metal compounds such as titanic acid esters, iron compounds, tin compounds, e.g. tin diacetate, tin dioctoate, tin dilaurate or the tin dialkyl salts of aliphatic carboxylic acids such as dibutyl tin diacetate, dibutyl tin dilaurate and the like. The catalysts are generally utilized in quantities of from 0.0005 to 0.1 parts per 100 parts of hydroxy group containing compound.

In addition to catalysts, auxiliary substances and/or additives may be also be used. Examples include lubricants; inhibitors, hydrolysis, light, heat and discoloration stabilizers, flameproofing agents, dyes, pigments, inorganic and/or organic fillers and reinforcing materials.

Reinforcing materials are, in particular, fibrous reinforcing materials such as, e.g., inorganic fibers which are known and used in polyurethane chemistry and which may be treated with a sizing agent.

More detailed information regarding such auxiliary agents and additives is described in the literature, for example the monograph by J. H. Saunders and K. C. Frisch, in "High Polymers", Volume XVI, Polyurethanes, Parts 1 and 2, published by Interscience Publishers in 1962 and 1964, respectively, or in German Auslegeschrift 2,901,774.

Other additives which may be incorporated in the TPU's are thermoplastics such as polycarbonates and acrylonitrile/butadiene/styrene terpolymers (e.g., ABS). Other elastomers such as rubber, ethylene/vinyl acetate polymers, styrene/butadiene copolymers, and other TPU's may also be used. Commercially available plasticizers, such as phosphates, pthalates, adipates, and sebacates, may also be used.

The components of stage A) are thoroughly mixed at temperatures above their melting point, preferably in a high-shear mixing unit. For example, mixing may be carried out in a mixing head, preferably a high-speed toothed-roll mixer, or in a nozzle. According to the invention, the prepolymer reaction (stage B)) should be continued to a substantially complete conversion. More than 80% macrodiol should preferably be reacted in this stage. The reaction temperatures are above 100° C. and preferably in the range from 100° C. to 250° C. The preferably continuous process is carried out in a tube reactor of which the length is such that, in conjunction with the reaction temperature, the conversion described above is guaranteed. The length-to-diameter ratio is preferably between 2:1 and 20:1. Conversely, for a constant tube length, the reaction must be controlled, for example, through the temperature in such a way that the described conversion is achieved.

In one particularly preferred embodiment, stages A) and B) are carried out in an intensively stirred tube reactor having a length-to-diameter ratio of 4:1 to 15:1. However, a combination of a nozzle and tube reactor, optionally with stirring, may also be used.

In stage C), the prepolymer prepared in stages A) and B) is mixed with the low molecular weight diol and, optionally, triol chain-extending agents. In the preferred continuous process, mixing should take place immediately after the substantially completed prepolymer reaction. A high shear-mixing unit, for example a mixing head or a high-speed screw extruder of low mixing volume, is preferably used for this stage also; high speed in the present context is in the order of about 1500 r.p.m. Mixing may even be carried out after the prepolymer reaction in the last part of the stirred tube reactor mentioned above. In stage D), the reaction mixture prepared in stage C) is introduced directly and continuously into a high-shear, high-viscosity reactor in which it is taken to complete conversion. (high shear in the present context corresponds to peripheral velocity of about 5 to 50 meter/second). Known co-kneaders, more particularly extruders, such as for example single-screw and twin-screw extruders, and also buss kneaders are preferably used. The temperatures of the extruder housing are selected so that the chain-extending reaction is taken to a complete conversion and the possible incorporation of the auxiliaries mentioned above and the other components can be carried out without any adverse effect on the end product.

In one particular embodiment, stages C) and D) may be carried out together in the extruder described above. In one preferred embodiment of this embodiment, stage C) is carried out in the first part of the extruder, which contains mixing screw elements, while stage D) is carried out in the second part of the extruder.

By virtue of the optimal conditions prevailing in each stage, TPU's having a broad range of properties can be selectively produced under control with only minor variations in their properties by the multistage prepolymer process according to the invention.

The products thus obtained have very good mechanical properties and are suitable for the production of injection molded articles and polyurethane films.

The invention is further illustrated but is not intended to be limited by the following examples in which all parts and percentages are by weight unless otherwise specified.

EXAMPLES

In the examples, the various test results were as indicated in the Table following the examples.

EXAMPLE 1

100parts by weight of a polybutane-1,4-diol adipate (molecular weight of about 2250), were heated to 120° C. and introduced by means of a gear pump into a tube equipped with a toothed-roll mixer. 40 Parts by weight molten (50° C.) 4,4'-diphenyl methane diisocyanate (MDI) were pumped into the same tube by a second gear pump. The tube had a length-to-diameter ratio of 8. The rotational speed of the mixer was approximately 1500 r.p.m. (corresponding to a peripheral velocity of 25 meter/second). The addition rate was adjusted so that the prepolymer mixture left the tube reactor with a conversion of about 95 mol-%, based on the polyester. To determine conversion, product samples were first short-stopped in dibutyl amine solution. Back-titration with HCl gave the unreacted residual NCO content from which the conversion can then be calculated.

In a directly adjoining mixing head, the prepolymer was then continuously mixed briefly and intensively with 10 parts by weight butanediol (60° C.) introduced by means of a gear pump. The reaction mixture obtained passed directly into a twin-screw extruder externally heated to 140°–200° C. The rotational speed of the screw was 300 r.p.m. The screw extruder used had a length of 2325 mm and a diameter of 53 mm. 0.6 Part by weight bis-ethylene stearyl amide was continuously introduced at the middle of the screw by means of a weigh feeder.

At the end of the screw, the hot melt was drawn off in the form of a strand, cooled in water bath and granulated. The granules were processed by injection molding to test specimens on which the properties set out in the Table were measured.

The moldings produced had good demolding properties. The tubular films obtained from the granules could readily be extruded.

Example 2

As in Example 1, the polybutane-1,4-diol adipate was heated to 140° C. and reacted in a tube reactor to form the prepolymer. The addition rate was increased so that the prepolymer again left the reactor with a conversion of approximately 95%.

The prepolymer and the butanediol were successively introduced into the first housing port of the twin-screw extruder after a short transport zone, and were mixed in the first part of the screw by commercially available mixing screw elements to enable intensive mixing. The second part of the screw was used for the reaction and for the incorporation of the bis-ethylene stearyl amide as in Example 1.

The moldings produced were readily demoldable. The tubular films obtained from the granules could readily be extruded.

EXAMPLE 3

As in Example 1, 100 parts by weight of a polybutane-1,4-diol adipate, (molecular weight about 2250), were reacted with 114 parts by weight MDI to form the prepolymer. The conversion reached a level of 98% in the tube reactor.

In the mixing head, the prepolymer was mixed with a mixture of 35 parts by weight butanediol, 1.75 parts by weight hexanediol and 1.27 parts by weight stearyl alcohol.

In addition to the 1.5 parts by weight bis-ethylene stearyl amide, 34 parts by weight of an ABS powder were introduced at the middle of the screw.

The moldings produced were readily demoldable.

EXAMPLE 4

As in Example 1, 100 parts by weight of a polybutanediol ether (molecular weight about 1000) were heated to 180° C. and reacted with 50 parts by weight MDI in a tube reactor to form the prepolymer in a conversion of 97%.

The prepolymer was mixed with 10.5 parts by weight butanediol in the mixing head. 0.6 Part by weight bis-ethylene stearyl amide was introduced at the middle of the screw.

The moldings produced were readily demoldable. The tubular films obtained from the granules could readily be extruded.

EXAMPLE 5

As in Example 4, 40 parts by weight benzyl octyl adipate were introduced at the middle of the screw in addition to the bis-ethylene stearyl amide.

The moldings produced were readily demoldable. The tubular films obtained from the granules could readily be extruded.

EXAMPLE 6

As in Example 3, 100 parts by weight of a polybutane-1,4-diol adipate (molecular weight about 2250), were reacted with 111 parts by weight MDI to form the prepolymer. The conversion reached a level of 96% in the tube reactor.

After chain extension with 35 parts by weight butane diol, 2.2 parts by weight bis-ethylene stearyl amide and 62 parts by weight of commercially available sized glass fibers 6 mm long and 12 μm in diameter were introduced at the middle of the screw.

The moldings produced were readily demoldable.

TABLE

| Example | | 1 | 2 | 3 | 4 | 5 | 6 |
|---|---|---|---|---|---|---|---|
| Hardness | DIN 53 505 Shore A: | 86 | 85 | 98 | 82 | 72 | |
| | Shore D: | | | 62 | | | 65 |
| Modulus 100% | DIN 53 504 MPa: | 6.2 | 6.0 | 25 | 5.0 | 3.2 | |
| Tensile Stress at break | DIN 53 504 MPa: | 49.5 | 48.2 | 53 | 42.7 | 28.5 | 55 |
| Elasticity | DIN 53 504 %: | 480 | 475 | 380 | 510 | 652 | 35 |
| Abrasion | DIN 53 516 mm3: | 42 | 41 | 38 | 48 | 64 | 41 |
| E modulus | DIN 53 457 MPa: | | | | | | 1,650 |
| Impact Strength (−25° C.) | DIN 53 453 kJ/M$^2$: | | | | | | 60 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A multistage process for the continuous production of thermoplastically processable polyurethane elastomers from a) one or more substantially linear polyols having number average molecular weights of from 500 to 5,000, b) one or more diisocyanates corresponding to the general formula OCN—Z—NCO wherein Z is a difunctional organic radical and c) one or more diol chain extenders having formula molecular weights of from 62 to 500 comprising:

A) continuously mixing the total amount of component a) with the total amount of component b), B) continuously reacting the mixture prepared in stage A) in a first reactor at a temperature of >100° C. to a conversion of >80 mol % based upon the amount of component a), to form an isocyanate-terminated prepolymer, C) continuously mixing said prepolymer with component c), with the total amounts of components a), b) and c) being such that the total NCO:active hydrogen ratio for the combined amounts of components a), b), and c) is from 0.9:1 to 1.2:1, and D) continuously reacting the mixture prepared in stage C) in a high shear reactor, said high-shear being separate from said first reactor.

2. The process of claim 1, wherein said component c) also contains triol and/or diamine chain extenders.

3. The process of claim 1, wherein a) component a) is selected from the group consisting of polyester diols, polyether diols, polycarbonate diols, and mixtures thereof, b) component b) is selected from the group consisting of dicyclohexyl methane diisocyanate, isophorone diisocyanate, hexamethylene diisocyanate, naphthylene diisocyanate, 4,4'-diphenyl methane diisocyanate, diphenyl methane diisocyanate isomer mixtures containing more than 96% by weight 4,4'-diphenyl methane diisocyanate, and mixtures thereof, and c) component c) is selected from the group consisting of ethylene glycol, butane diol, hexane diol, 1,4-di-(β-hydroxyethyl)-hydroquinone, and mixtures thereof.

4. The process of claim 1, wherein steps A) and B) are carried out together in a tube reactor having a length-to-diameter ratio of 4:1 to 15:1 equipped with a high-shear stirrer having a peripheral velocity of 5 to 50 meter/second, at reaction temperatures of from 100° to 250° C.

5. The process of claim 1 wherein steps C) and D) are carried out together in a two-part extruder, step C) being carried out in the first part equipped with mixing screw elements, and step D) being carried out in the second part.

6. The process of claim 1 wherein one or more members selected from the group consisting of other thermoplastic resins, reinforcing materials and plasticizers are introduced into said high-shear reactor.

7. The process of claim 1 wherein said high-shear reactor is an extruder.

* * * * *